United States Patent [19]
Hutchison

[11] Patent Number: 6,038,556
[45] Date of Patent: Mar. 14, 2000

[54] ADAPTIVE AUTONOMOUS AGENT WITH VERBAL LEARNING

[76] Inventor: William R. Hutchison, 2002 Linden Dr., Boulder, Colo. 80304-0425

[21] Appl. No.: 09/143,909

[22] Filed: Aug. 31, 1998

Related U.S. Application Data

[62] Division of application No. 08/451,543, May 26, 1995, Pat. No. 5,802,506.

[51] Int. Cl.[7] ........................................ G06E 1/00
[52] U.S. Cl. ................................ 706/25; 706/19; 706/27
[58] Field of Search ............................... 706/25, 27, 19, 706/20, 41, 23

[56] References Cited

U.S. PATENT DOCUMENTS

| | | |
|---|---|---|
| 4,933,871 | 6/1990 | DeSieno . |
| 5,124,918 | 6/1992 | Beer et al. . |
| 5,172,253 | 12/1992 | Lynne . |
| 5,214,715 | 5/1993 | Carpenter et al. ................... 382/157 |
| 5,402,521 | 3/1995 | Niida et al. . |
| 5,420,964 | 5/1995 | Sugasaka et al. . |
| 5,448,681 | 9/1995 | Kahn . |
| 5,515,477 | 5/1996 | Sutherland . |
| 5,761,644 | 6/1998 | Ueda et al. ............................ 705/1 |
| 5,802,506 | 9/1998 | Hutchison ............................ 706/20 |

OTHER PUBLICATIONS

Barto, Reinforcement Learning and Adaptive Critic Methods; D.A. White & D. Sofge (Eds.) Handbook of Intelligent Control; Van Nostrand,1992, pp. 469–491.

Brooks, *Elephants Don't Play Chess;* Elsevier Science Publishers B.V. (North–Holland), 1990, pp. 3–15.

Caudill, Expert Newtworks; Byte, Oct. 1991, pp. 108–116.

Cecconi & Parisi, *Neural Networks With Motivational Units;* Institute of Psychology, National Research Council, pp. 346–355.

Skinner, Verbal Behavior; Language, vol. 35, No. 1 (1959), pp. 26–59.

Donahoe & Palmer, *Learning and Complex Behavior;* 1994, pp. (ii–ix) 270–323.

Epstein, Generativity Theory and Education; Educational Technology, Oct. 1993, pp. 40–45.

Fahner and Eckmiller, Structural Adaptation of Parsimonious Higher–Order Neural Classifiers; Neural Networks, vol. 7, No. 2, 1994, pp. 279–289.

Hinton and Becker, Using Coherence Assumptions to Discover the Underlying Causes of the Sensory Input; Connectionism Theory and Practice (Davis, Ed.), 1992, pp. 3–21.

Hutchison & Stephens, Integration of Distributed and Symbolic Knowledge Representations; Proceedings, First International Conference on Neural Networks, Jun. 1987, p. II–395–II–398.

Lin, Programming Robots Using Reinforcement Learning and Teaching; Robot Learning, pp. 781–786.

Maes, Modeling Adaptive Autonomous Agents; Preprint–Artificial Life Journal, Vo. 1, Nos. 1&2, pp. 1–37.

Redding, Kowalczyk, and Downs, Constructive Higher–Order Newwork Algorithm That Is Polynomial Time; 1993, Neural Networks, vol. 6, pp. 997–1010.

(List continued on next page.)

*Primary Examiner*—Eric W. Stamber
*Assistant Examiner*—Wilbert L. Starks, Jr.
*Attorney, Agent, or Firm*—Holland & Hart LLP

[57] ABSTRACT

An autonomous adaptive agent (100) which can learn verbal as well as nonverbal behavior. The primary object of the system is to optimize a primary value function (7) over time through continuously learning how to behave in an environment (which may be physical or electronic). Inputs (1) may include verbal advice or information from sources of varying reliability as well as direct or preprocessed environmental inputs (1C). Desired agent (100) behavior may include motor actions and verbal behavior which may constitute a system output (3) and which may also function "internally" to guide external actions. A further aspect involves an efficient "training" process (306) by which the agent (100) can be taught to utilize verbal advice and information along with environmental inputs (1C).

14 Claims, 5 Drawing Sheets

OTHER PUBLICATIONS

St. John, Learning Language in the Service of a Task; Department of Cognitive Science, U. of C, San Diego, pp. 271–276.

Skinner, *Verbal Behaviour;* Prentice–Hall, Inc., pp. ix, 1–453.

Sutton, Temporal Credit Assignment in Reinforcement Learning (Delayed Reinforcement); 1984, pp. 92–98.

Whitehead, A Complexity Analysis of Cooperative Mechanisms in Reinforcement Learning; Learning and Evaluation Functions, pp. 607–613.

A.G. Barto et al., Neuronlike Adaptive Elements Tant Can Solve Difficult Learning Control Problems, IEEE Trans. on Systems, Man, and Cybernetics, vol. SMC–13(5), pp. 834–846, Sep. 1983.

P.J. Werbos, Backpropagation and Neurocontrol: A Review and Prospectus, IEEE Int'l. Conf. on Neural Networks, pp. I–209 to I–216, Jun. 1989.

J. Schmidhuber, An On–line Algorithm for Dynamic Reinforcement Learning and Planning in Reactive Environments, IEEE Int'l. Conf. on Neural Networks, pp. II–253 to II–258, Jun. 1990.

K.R. Stephens et al., Dynamic Resource Allocation Using Adaptive Networks, Neurocomputing, vol. 2(1), pp. 9–16, Jun. 1990.

P.J. Werbos, Consistency of HDP Applied to a Simple Reinforcement Learning Problem, Neural Networks, vol. 3(2), pp. 179–189, Dec. 1990.

J.C. Hoskins and D.M. Himmelblau, Process Control via Artificial Neural Networks and Reinforcement Learning, Computers and Chemical Engineering, vol. 16(4), pp. 241–251, Dec. 1992.

B.L. Digney and M.M. Gupta, A Distributed Adaptive Control System for a Quadruped Mobile Robot, Int'l Conf. on Neural Networks, pp. 144–149, Mar. 1993.

H.S. Del Nero and J.R.C. Piqueira, Cognitive Science and the Failure of Behaviorism: Quantum, Classical and Mind Indeterminacies, Int'l Conf. on Systems, Man, and Cybernetics, vol. 4, pp. 638–643, Oct. 1993.

K. Otwell et al., A Large–Scale Neural Network Application for Airline Seat Allocation, World Congress on Neural Networks, vol. 1, pp. I–145 to I–150, Jun. 1994.

R. Maclin and J.W. Shavlik, Incorporating Advice into Agents that Learn from Reinforcements, Proc. 12th National Conf. on Artificial Intelligence, vol. 1, pp. 694–699, Dec. 1994.

D. Gachet et al., Learning Emergent Tasks for an Autonomous Mobile Robot, Int'l Conf. on Intelligent Robots and Systems, vol. 1, pp. 290–297, Sep. 1994.

A. Newell & H.A. Simon, GPS, A Program that Simulates Human Thought, reprinted in Computers and Thought, AAAI Press, pp. 279–293, Dec. 1995.

ADAPTIVE AUTONOMOUS AGENT WITH VERBAL LEARNING

RELATED INVENTIONS

This is a division of application Ser. No. 08/451,543 filed on May 26, 1995 now U.S. Pat. No. 5,802,506, which is hereby incorporated by reference in its entirety.

BACKGROUND OF THE INVENTION

1. Field of the Invention

The present invention relates in general to artificial intelligence systems and in particular to a new and useful system which builds upon artificial neural network designs and learning techniques with further processes to achieve verbal functions.

2. Relevant Background

Artificial neural networks (ANNs) are well known, and are described in general in U.S. Pat. No. 4,912,654 issued Mar. 27, 1990 to Wood (Neural networks learning method) and in U.S. Pat. No. 5,222,194 issued Jun. 22, 1993 to Nishimura (Neural network with modification of neuron weights and reaction coefficient), both of which are incorporated herein by reference.

ANNs are systems used to learn mappings from input vectors, X, to output vectors, Y. In a static and limited environment, a developer provides a training set—a database—that consists of a representative set of cases with sensor inputs (X) and corresponding desired outputs (Y), such that the network can be trained to output the correct Y for each given input X, but is limited to the developer's specification of correct outputs for each case, and therefore may not succeed in optimizing the outcomes to general users.

In the more general case, it is valuable or essential for the system to learn to generate outputs so as to optimize the expected value of a mathematical "Primary Value Function", usually a net present expected value of some function over time. It may also be essential to learn a sequence of actions to optimize the function, rather than being restricted to a single optimal output at each moment (e.g., a robot may have to move away from a nearby object having a local maximum value, in order to acquire an object having a larger, or global, maximum value). The preferred class of techniques meeting these requirements is adaptive critics, described in Miller, Sutton, and Werbos, Eds., Neural networks for control. Cambridge, Mass.: MIT Press (1990), and in Barto, A., Reinforcement learning and adaptive critic methods. In D.A. White & D. Sofge (Eds.), Handbook of Intelligent Control: Neural, Fuzzy, and Adaptive Approaches. Van Nostrand (1992).

Connecting actual or simulated sensors and actual or simulated actuators to the inputs and outputs, respectively, of adaptive critics and related systems, make complete adaptive autonomous agents. These agents are a focus of some researchers in robotics sometimes called "behavior-oriented artificial intelligence" as described in U.S. Pat. No. 5,124,918 and in Brooks, 1990, and Maes, 1993–4.

The advantages of these systems are that they are by definition capable of acting in real environments. With adaptive critics and related techniques, a training set may either be constructed by the developed, or collected from actual historical data, or created by putting the system into contact with the actual application environment.

While ANN techniques have several major advantages (they learn rather than requiring programming, they can accept many forms of inputs, and certain designs can perform mathematical optimization of a value function) they can only learn from direct experience and not from verbal/symbolic/codified knowledge which comprises the large majority of available human knowledge.

Although ANNs have been used for manipulation of language, they have not been used for functional interaction with objects. See, for example (Davis, 1992); Rumelhart and McClelland (1986) (ANN taught to output the past tense of verbs when given the present tense form); Elman (1992) (ANN taught to predict the next word in a sentence). The majority of research attempts to assign a grammatical role for each word in sentences. In this research, the values used in the training signals are provided by the trainer rather than being derivable from the functional value contributed by the verbal responses.

On the other hand, expert systems incorporate verbal knowledge, especially condition-action pairs or rules. However, the knowledge in most potential application domains for intelligent systems cannot be represented adequately by such rules. Moreover, traditional expert systems have no capability to learn from experience to improve performance. A further disadvantage of expert systems is the effort required to formulate the necessary rules. The overall architecture designs require so much processing that they have been far to slow to control realistic sensorimotor systems for robotics.

To reduce the burden of formulating the rules for expert systems, an approach typically called machine learning was developed. This approach consists basically of logical inference from data to produce rules. This is a very restricted form of learning as compared with the more general and powerful methods of ANNs.

While the potential value of combining the learning, representation, and optimization of ANNs with verbal capabilities such as those of expert systems and fuzzy logic is clear, prior attempts have achieved only very limited functionality.

Hybrid designs contain both expert system and ANN subsystems, so they are inherently complex, and have achieved only very limited results. See, for example, Caudill, M. (1991) Expert networks. Byte, 16(10), 108–116.

The present invention draws from theoretical analyses regarding the problems of functional language usage outlined in Verbal Behavior, by B. F. Skinner in 1957. The key assumption of Skinner's "radical behaviorist" theory is that verbal behavior is not fundamentally different from nonverbal behavior. Linguistics theorists in general and connectionist language researchers in particular have been aware of Skinner's theory since its publication, but have consistently vehemently rejected it as being erroneous or not applicable (Chomsky, 1959; Harris, 1993; Pinker, 1995). The main criticisms are that the theory supposedly could not produce the very rapid learning of language which is seen with humans, that it could not account for the production of novel sequence of speech, and in general that the "simple" concepts of operant conditioning could not account for the enormous complexity of language. The authors of the seminal volumes on neural networks, including language research, (McClelland, Rumelhart, et al., 1986) explicitly reject the behavioral paradigm: "In this sense, our models must be seen as completely antithetical to the radical behaviorist program." (p. 121).

Certain ANN architectures, such as higher-order networks, have the potential to permit rules to be programmed directly into networks. See, for example, Hutchison, W. R. & Stephens, K. R., Integration of distributed and symbolic knowledge representations, Proceedings of the first international conference on neural networks, 2, 395–398, IEEE Press. This can be accomplished by connecting the condition part of the rule (as inputs) to the action part of the rule (as outputs). Most ANN architectures and algorithms are not compatible with such an approach.

The most common technique for training ANNs to follow rules has been to construct training sets whose mastery requires following the rules. The ANN may be allowed to make errors or it may be artificially forced to make the correct response (Lin, 1991; Whitehead, 1991). As with direct programming, the resulting system complies, but does not explicitly follow, the rules. There are a number of major disadvantages to training compliance by examples:

a. Constructing the set of training examples is usually a significant additional effort beyond formulating the rule; it must be done for every rule.

b. It may be difficult or impossible to create a training set that contains the desired relationships while avoiding irrelevant relations.

c. It is especially difficult—even impossible in some networks—to train correct behavior where certain actions are almost always rewarded (e.g., crossing railroad tracks, investing in real estate in previously solid markets), but on rare occasions have catastrophic results.

d. Many relations are so remote in time or space, or so weak in probability that they will never be learned by direct experience of an individual (e.g., avoiding chemicals that cause cancer years later). If they are taught by overrepresenting them in the sample, the learning will be inappropriate for optimization.

In both direct programming and training set techniques, the system complies with the given rules, but does not learn the rule as a verbal statement. Lack of explicit verbal content imposes a number of major disadvantages on such systems.

A "rule-compliant" network cannot adequately state what it knows. In certain types of networks the structure can be decoded, but a listing of the associations generally contains a large number of irrelevant relations. Another approach (Gallant, 1988, 1993) is to determine partial derivatives by testing the impact of manipulating an input on an output, but this is not practical for complex relations which are typical of real world problems. Systems that cannot state their knowledge cannot:

i. Explain or justify their actions.

ii. Teach another person or system.

iii. Learn from discussing their knowledge with other agents (human or machine).

This weakness is very serious in any case, but especially in view of the rapidly developing communications network in which computers are connected, where the ability to converse verbally with other agents opens up a vast potential not otherwise available.

An important process in human problem solving uses verbal behavior to transform a novel problem into a new problem or subproblems for which solutions are known (Donahoe & Palmer, 1994). For example, if the answer to the problem "23 times 117" is not immediately known, we "break down" the problem into subproblems for which we have answers (e.g., 3 times 7). Networks without explicit verbal behavior cannot do such problem solving. Even more demanding is "creative problem solving" where we may have to perform several tentative "verbal transformations" before even recognizing how to proceed.

Current neural network methods are handicapped by their lack of verbal behavior, because the network is required to learn a complex task all at once rather than decomposing it. For example, Minsky and Papert (1969) asserted that linear nets cannot learn the exclusive OR problem. On the contrary, the Applicant has trained a linear network to perform this task perfectly, using verbal behavior in the same manner as many humans actually solve it. First the agent learns the "OR" problem more typical in the real world: when presented with the two input stimuli, the agent responds to any positive stimulus with a positive output on the main output. Then the agent is taught an additional verbal response: If both stimuli are positive, the agent emits, in addition to the positive main response, a response which functions like saying "both". After saying "both", in the next network cycle that verbal response is available as an additional input to itself, which suppresses the system's positive response and strengthens a negative response. In general terms, the verbal capability of the system enables it to reduce the effective dimensionality of the problem. Networks that can be taught these verbal responses can learn to solve many problems much faster.

As described above, networks can be taught or programmed to comply with rules, which is only one simple kind of input-output. However, such methods do not work for any other of the myriad kinds of relations in the world, such as: above, in, of, sister of, inside, subclass of, threatens, suggests, is the capital of, etc. ANN language research and knowledge-based systems that accommodate such relations have to explicitly program their processing: they cannot learn new relations from experience as can humans. This is a huge weakness.

Beyond being able to learn many kinds of relations is the challenge of deriving some value from the knowledge. Except for the trivial case of being able to repeat a relational statement, learning it will not be useful unless the agent has also learned how to combine the statement with other relational statements, and ultimately to actions. An agent must explicitly learn how to combine X>Y and Y=Z to conclude that X>Z; and that X>Y and Y<Z does not lead to any conclusion about the relation of X and Y. This essential learning has also not been done with neural networks.

Jameson (1993) has proved that certain kinds of problems cannot be solved without the use of models or representations of the world. Most neural network architectures have no model component and therefore cannot solve such problems. Those that do (e.g., White & Sofge, 1992) require that the model be specified to a significant (and often impossible) degree by the system developer. Verbal behavior permits a system to construct such models.

Obviously, some sources of information are more reliable than others, such that information should be differentially learned, and thereafter differentially relied upon. ANNs are programmed or trained to comply with all advice, or if differential strengths are used, they must be given by the developer rather than learned. If a new statement were then given from a known source, the system should be able to generalize regarding the reliability of the statement from the reliability of previous statements from that source; but existing methods would not handle that case. This capability should go beyond considering the source: Take Einstein's advice about physics but not about economics.

Apart from the differential reliability of statements, they have different degrees of value. It may be perfectly reliable that there are 743 cats in Chanute, Kansas, but the value of this knowledge is so low that an agent should not waste resources learning it.

SUMMARY OF THE INVENTION

Briefly stated the invention involves an autonomous adaptive agent which can learn verbal as well as nonverbal behavior. The primary object of the system is to optimize a primary value function over time through continuously learning how to behave in an environment (which may be physical or electronic). Inputs may include verbal advice or information from sources of varying reliability as well as direct or preprocessed environmental inputs. Desired agent behavior may include motor actions as well as verbal behavior. In addition to being a possible system output, verbal behavior may function "internally" to guide external actions. A principal novelty of the invention is an efficient "training" process by which the agent can be taught to utilize verbal advice and information along with environmental inputs. A further object of the system is to restate verbal statements it has learned when prompted. A further object of the system is to solve novel problems.

Advantages of the system in accordance with the present invention over prior art include:

1. The system can learn to use verbal advice and other verbal information without the need for constructing sets of training examples. This ability saves the developer a large amount of work and increases the likelihood of achieving desired results.

2. The system can learn to perform correct behavior even where certain actions are almost always rewarded, but on rare occasions have catastrophic results.

3. The system can learn relations that are so remote in time or space, or so weak in probability that they will never be learned by direct experience of an individual.

4. Unlike ANNs trained by examples, the system can meet the requirement of many applications to learn a constant series of new verbal inputs and use them immediately to perform dictated tasks correctly the first time.

5. The system can overcome the inherent tendency of most adaptive systems (including humans) to be drawn to smaller immediate consequences over larger delayed consequences.

6. The system combines talking and listening in the same device, rather than requiring separate language understanding and production systems.

7. The system can use verbal behavior to transform a novel problem into a new problem or subproblems for which solutions are known.

8. The system can automatically learn to learn and depend more on information from reliable sources of information, or even more specifically to discriminate by domain. Apart from the differential reliability of statements, it can differentially learn statements which have more value for action. Relative value can also be the basis for resolving conflicts between rules of differing importance.

9. The system can repeat the verbal knowledge it has learned.

10. When the Primary Value states are connected as inputs to the system, the system can learn to adjust its behavior continuously as a function of its current goals/needs/state so as to optimize its Primary Value Function over time, while also incorporating information about environmental opportunities and spatiotemporal distribution of Primary Values.

DETAILED DESCRIPTION OF THE INVENTION

Figure 1:
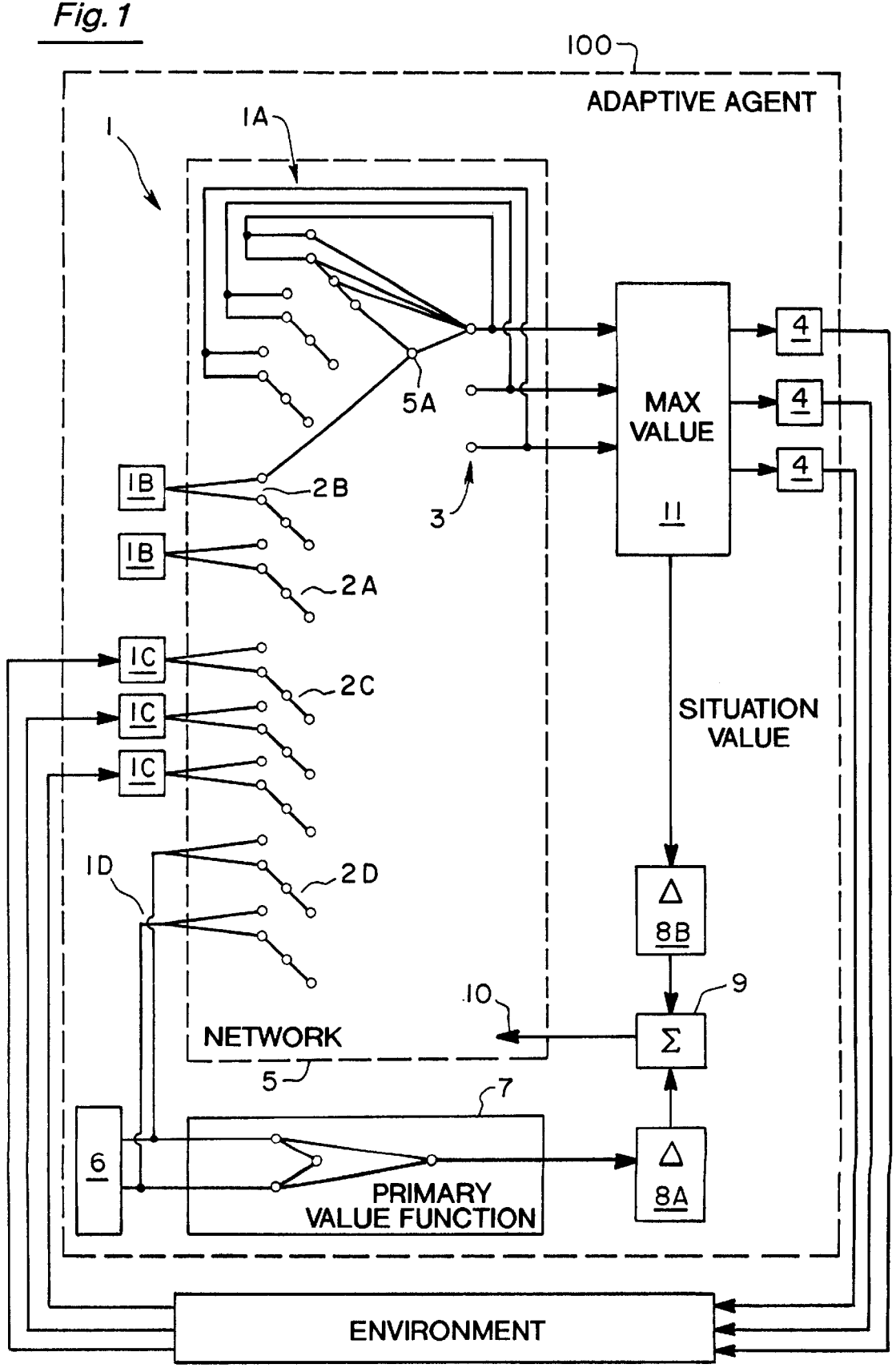
FIG. 1 is a schematic diagram of an architecture suitable for implementing the invention.

Referring to FIG. 1, a suitable architecture for implementing the invention is described. Each element can be implemented in hardware or software (i.e., the system can be a freestanding robot or an electronic agent in a computer). Sensors (1) acquire information and convert it into a form appropriate for input to Network Stimuli (2). Sensors may comprise Recurrent internal connections (1A) which sense the system's own previous outputs on a one-to-one basis or alternatively external sensors which detect system actions (FIG. 1 shows direct internal connections, the preferred embodiment). Alternatively, sensors could be connected to intermediate "hidden" nodes in the network. At a minimum, the sensor directs at least whether the response was executed or not, but if internal connections are used, the input can also detect an absolute or relative measure of value for unexecuted responses, if such information is essential or valuable for the system's desired performance. Sensors may also comprise Proprioceptive sensors (1B) to detect states of the agent's body, if required by the kinds of tasks desired for the agent (e.g., the position of the agent's arm). Sensors may also comprise External sensors (1C) such as inputs from light or sound sensors, which may be preprocessed (e.g. from an electronic speech analysis system or Fourier analyzer; raw shapes in letters or recognized discrete letters). The external information may come from sources in a 3-D environment or from a pure electronic environment, such as the value in a database or from an Internet connection. This set of external sensors should include sensors to indicate current receipt of Primary Values from the environment where this information is required or valuable for the system's actions. Sensors may also comprise a sensor for each Primary Value in the system (1D), which senses the current accumulation of the primary value or other measure from which change can be detected. Examples include the battery charge level, money in an account, or number in a counter.

Sensors (1) are connected to Input or stimulus nodes (2) within the network, which are activated by signals from the sensors (1) and connect to other nodes within the network. Each sensor dimension typically connects to more than one input node. For example, a proprioceptive arm position sensor might be connected to three input nodes: one for arm up, one for arm down, and one for arm half-way between. In the case of electronic character (ASCII) input, there might be an input node for each possible ASCII value.

Figure 2:
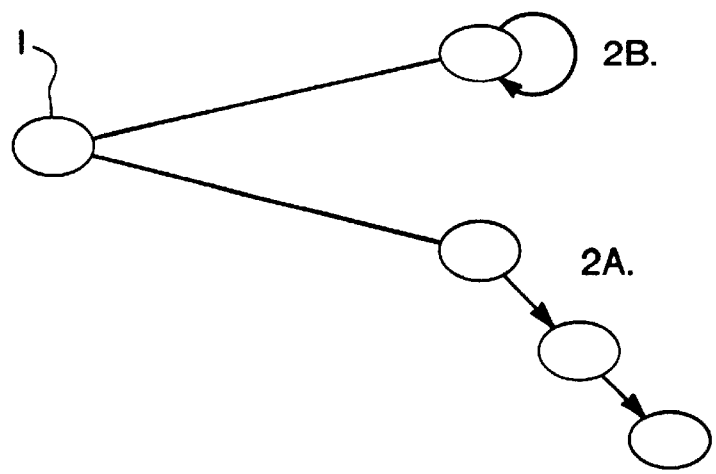
FIG. 2 is an expanded diagram of input nodes from FIG. 1.

To maintain information about inputs beyond the immediate presentation, "lagged" nodes 2A and, optionally, "decaying" nodes 2B are used. FIG. 2 shows a larger scale view of input nodes. The sensor node is connected to the two types of input nodes.

Lagged nodes (2A) are a mechanism for inputting the past states of an input node. This kind of general mechanism is well-known. A range of options are discussed in Elman (1992). In the preferred embodiment, each sensor 1 is connected to a series of "lagged input nodes 2A." Each lagged input node 2A is activated by the state of the sensor 1 at the previous time step (to its left in FIG. 2). There may be between zero and a small number of lagged inputs, typically between 1 and 5.

Optionally, each sensor 1 may also be connected to a Decaying input node (2B) which is activated by the associated sensor 1 and by its own prior state, in such a way that if the sensor 1 is active the decaying node 2B will be activated, but if the sensor 1 is inactive the decaying node 2B will decrease its activation level each time step. Various functions are possible, but a typical decay function is NewActivation=PriorActivation * 0.7, with an activation of 0 after the level drops below a threshold such as 0.1. This kind of mechanism is also well-known in the neural network field.

Output or response nodes (3) receive the value from the network activations. In the simplest design with wide applicability, the highest-value output node 3 activates its corresponding Actuator 4 ("winner-take-all"). Optionally, more than one output node 3 at once may activate Actuator nodes 4: nodes 3 with values above a threshold, or the highest-valued node 3 within each mutually-incompatible set (e.g., lift arm and lower arm).

Output nodes (3) may be connected to any type of actuator 4, including a motor, printer, video display, modem, sound or speech production system, or even to no external actuator (but still with connections to recurrent inputs 1A above). Actuators 4 must be adequate for performing the system's desired external behavior. Outputs 3 should also include verbal responses necessary for the system's "internal" processes, if these are not also in the former set. For example, a robot may only be required to perform motor movements, but will need some kind of verbal outputs to learn any verbal behaviors required for controlling the movements.

Neural network (5) may be implemented in hardware or software. Many network architectures (or equivalent data structures) would be adequate, provided they accept a variety of input types and produce a set of numerical outputs, and that the structure is amenable to an adaptive critic or reinforcement learning algorithm in the general sense described by Barto (1992). Higher-order nets (Giles & Maxwell, 1987) which include direct input-output connections are relatively more feasible for this device than in mainstream neural network applications due to their reduced need for hidden nodes (5A). In general, networks with direct connections are far preferable given their much faster learning rates and reduced computation and storage needs. It will often be advantageous to make use of a mechanism for adding hidden nodes as necessary, as described, for example, by Fahner & Eckmiller (1994) and Redding, Kowalczyk, & Downs (1993). The techniques for neural network implementations are well known and described in White & Sofge (1992), and for higher-order networks see Giles & Maxwell (1987).

A plurality of Primary Values (6) is stored in storage means suitable for the particular system; these values will be referenced in the system's Primary Value Function (7). Examples include batteries for a robot to store electrical charge, a tank for water or fuel, a holder for money, a counter to store abstract units of value such as points. Exceptions to this requirement may be Primary Values whose specifications do not require accumulation; e.g. "pain" from touching certain sensors. In a robotic system, the depletion of stored Primary Values 6 (e.g., fuel, water) will occur automatically; in a simulated system, this depletion must be programmed or included in the Primary Value 6 amounts. It may be advantageous in simulated systems to program a "metabolism" process to deplete specified Primary Values 6 each time step in addition to the variable action-dependent depletions (e.g., motor responses use more energy than speaking; some energy and other Primary Values 6 are usually depleted in each time step independent of the selected actions).

Primary Value Function means (7) generates a single quantity applied to value change sensor 8A for any set of Primary Value inputs.

Change Sensors (8) output the amount by which its input changes in one time step, and comprise Change Sensor (8A) for the Primary Value Function and Change Sensor (8B) for the Situation Value=value of the maximum valued Output node (or a function of multiple Outputs if the system permits such).

Summator (9) outputs the sum of its inputs.

Preferably, the learning process (10) would be of the adaptive critic class (Barto, 1992; Miller, Sutton, & Werbos, 1990), implemented in hardware or software. Learning modifies the network connections and occurs in each time step. The system processes sensory input, responds, and learns in a series of discrete time steps. The algorithm must be properly matched with the other elements of the system, using techniques well-known in the art.

The learning should take place each input-output-evaluation cycle. The learning may modify only connections which were just active or following Sutton's (1984) lambda procedure, may modify previously-active connections to a lesser extent.

Figure 4:
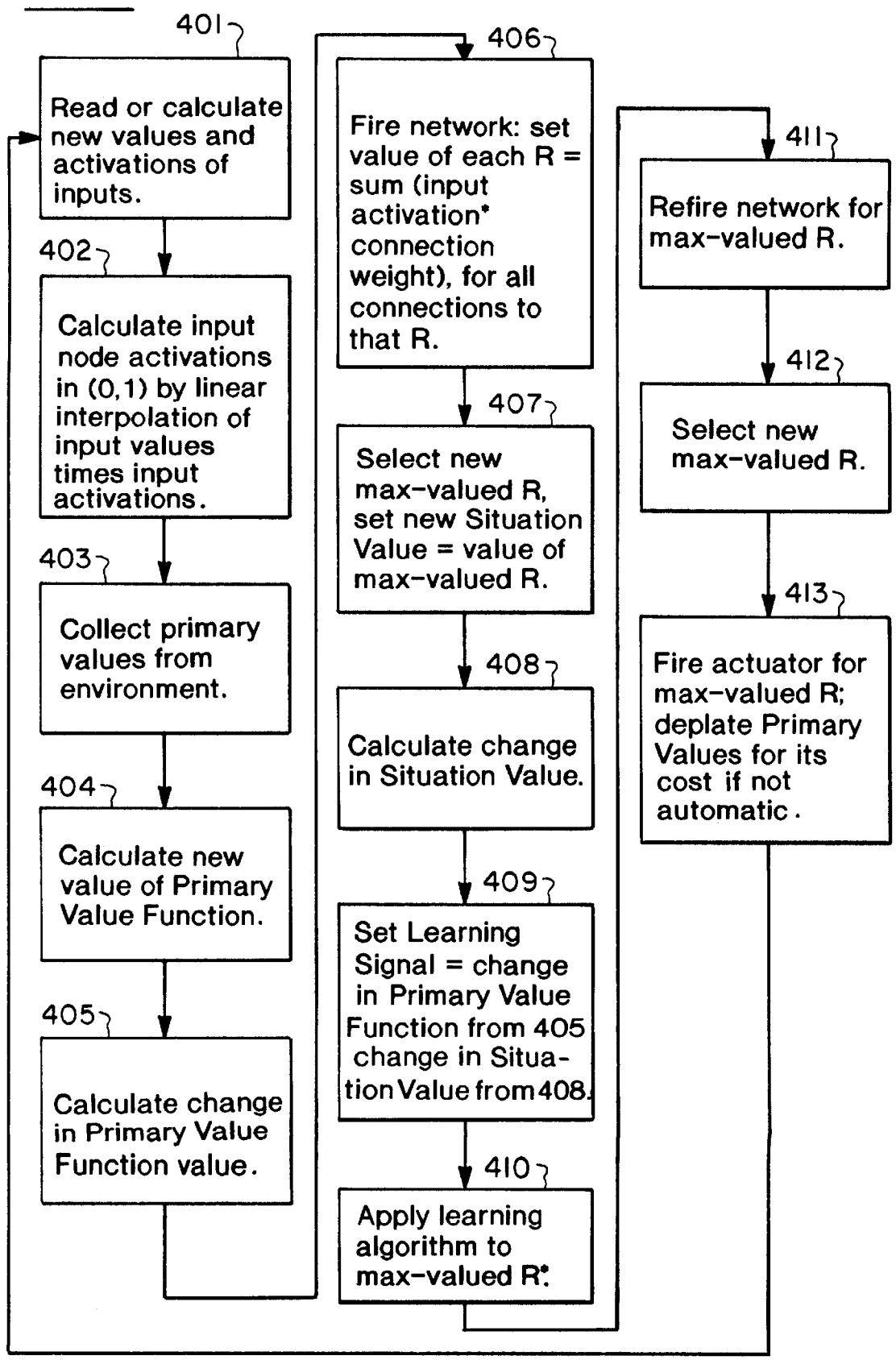
FIG. 4 is a flow chart of the learning process for the system in FIG. 1.

FIG. 4 shows a flowchart of a suitable behavior and learning algorithm for a network such as in FIG. 1 for use with the present invention. The network performs the following steps:

1 Get values and activations of inputs, by reading sensors (e.g., sensors 1A, 1B, and 1C in FIG. 1) in a robot or by calculation in a simulation.

2 Calculate input node activations in a given range, typically normalized to 0 to 1, by linear interpolation between nodes multiplied by input activation. If the input value falls between the values of two input nodes for an input dimension, both are activated in proportion to their proximity to the input value by linear interpolation. For example, suppose an input dimension for calories-received had 4 input nodes for the values of 0, 2, 4, and 8, respectively. If 3.5 calories were received, this value is between the second and third input nodes (between 2 and 4 calories). By linear interpolation, node 2 is activated 0.25, node 3 is activated 0.75, and nodes 1 and 4 are activated 0. As another example, suppose an input dimension for ASCII characters had 4 input nodes for the values of 65, 66, 67, and 68, respectively [characters A, B, C, D]. If the input had a value of 66, node 2 would be activated 1.0 and the other nodes would be activated 0. Each node is then multiplied by the input activation. For example, if the ASCII input in the second example had an input activation level of 0.6 [e.g., a fuzzy B], then node 2 would have an activation of 1.0 * 0.6=0.6. If the input activation in example 1 was 0.8, node 2 would have an activation of 0.2 and node 3 would have an activation of 0.6.

3 Collect any primary values in the environment (e.g., calories, points) from inputs 1D.

4 Calculate the new value of a Primary Value Function (PVF), given changed Primary Value levels.

5 Calculate the change in value of the PVF (i.e., new value minus old value).

6 Fire the network by accumulating, for each response, for all connections to the response, the sum of the input node activation times the value of the connection between the input node and the response.

7 Select the maximum valued response. Set the Situation Value to its value.

8 Calculate the change in Situation Value (i.e., new value minus old value).

9 Calculate the learning signal=change in PVF+change in Situation Value. I.e., sum the results from steps 5 and 8 in summator 9 of FIG. 1.

10 Apply the learning algorithm to determine a new maximum valued response. A simple but effective algorithm is:

Learning rate is a system parameter between 0 and 1, typically approximately 0.25.

TotActiv=Sum of all activations for all input nodes connected to this response.

Momentum=previous momentum for this connection * MoMult, where MoMult=1.15 if the sign of the learning signal is the same as its sign the last time this connection learned;

else=0.7. However, constrain Momentum to the range (0.2, 5).

Set each new connection weight=previous connection weight+(learning signal * Learning rate * Momentum * activation of this input / TotActiv)

11 Refire the network to redetermine for the maximum-valued response because its value may have changed from step 10.

12 Select the new maximum-valued response.

13 Fire the selected actuators 4 for the maximum-valued response. E.g., lift the robot arm or simulate saying the letter "A". If the system is a robot, the primary values 6 will be depleted automatically (e.g., the battery will be discharged by the movement), but in a simulated system the change in primary values 6 programmed for the maximum-valued response must be tallied in the counters.

Training the ANN proceeds as follows.

The initial "empty" state of the neural network must next be modified in the agent to teach it verbal behavior efficiently and enable it to continue learning in an efficient way. Adaptive systems can learn many things from simply putting them into an environment and letting natural feedback work. However, for complex behaviors such as those that are the objects of this system, unsupplemented natural feedback is extremely inefficient. This "training" process does not preclude also making direct modifications to network connections, but as a practical matter such direct modification will rarely be necessary or advantageous.

The training process may be conducted manually by a skilled human following these steps, but it is feasible and may be preferable to utilize computer-based training technology, as in the preferred embodiment.

After a device has been modified to achieve the user's specifications, it will often be possible to make copies of the trained system in order to avoid repeating the training process for each replica—this is especially feasible in systems implemented predominantly in software.

Figure 3:
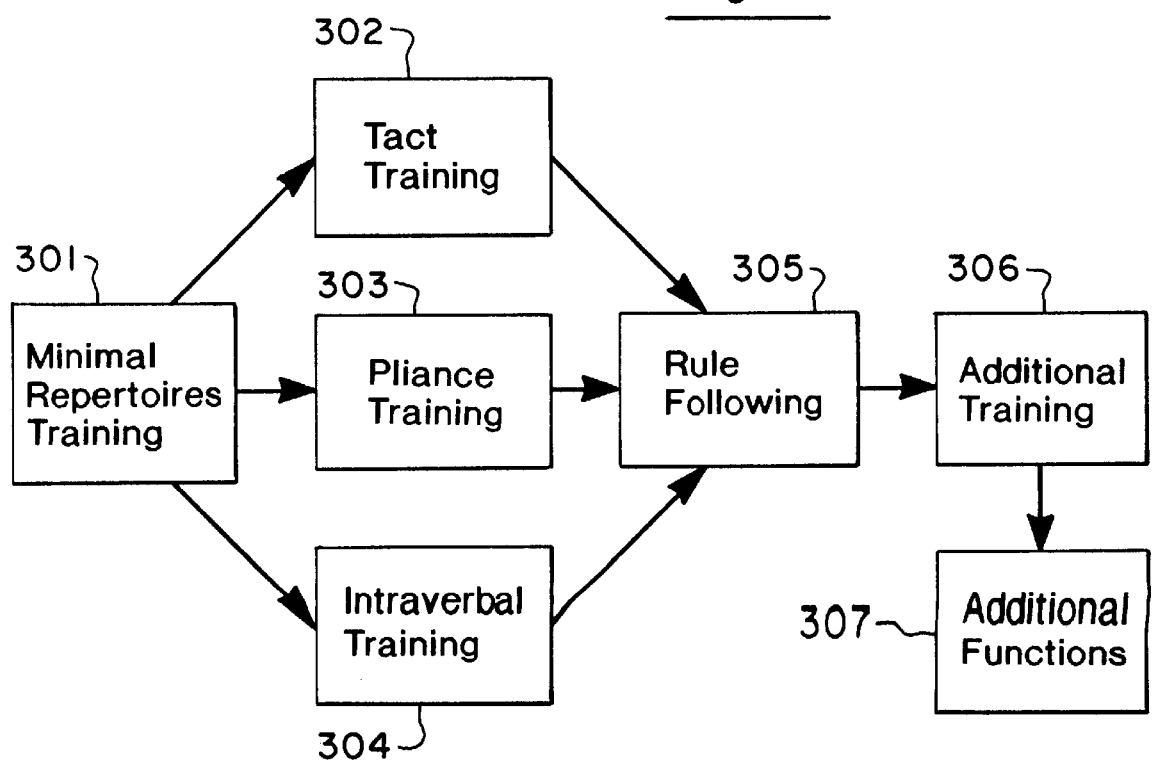
FIG. 3 is a flow chart of dependencies among the core training processes.

FIG. 3 shows the process for modifying the initial state of the system to achieve its objects in a particular application. As indicated by lines showing dependencies: each of training processes 302, 303, and 304 utilizes "prompts", such as showing "A" to get the system to say "A". Those dependent processes cannot be done until that specific "minimal repertoire" has been trained in Process 1; i.e., a repertoire with visual character stimuli and vocal character responses. Processes 302, 303, and 304 in parallel boxes in the path may be performed repeatedly in any order for new content, but the trained device indicated in state 305 will only follow rules for which its component tacts, pliance, and intraverbals have been previously trained in Processes 302, 303, and 304, respectively. Processes in step 306 enable more advanced verbal functioning in state 307, such as logical reasoning combining more than one statement.

Process 1. The central challenge in training desired system behavior is to get the system to perform the desired outputs/responses at nodes 3 in FIG. 1 when certain input patterns are presented on input nodes 1A–1C in FIG. 1, so that the connections can be strengthened by then presenting positive consequences ("reinforcement"). The trainer generally has control over presenting desired input patterns to nodes 1B–1C as well as appropriate consequences after the responses, but getting the system to do the correct response at the desired moment is not under the trainer's direct control. One approach that has been successfully used in prior art is to "artificially" intervene in the system's control loop to force the desired response to be emitted, rather than the highest-valued response, if different. One disadvantage of this approach is that errors during training are often essential for suppressing undesired connections. The trainer can force erroneous responses to occur, but it is extremely difficult to specify which errors to program such that the system will learn everything it needs to perform correctly when it must "make its own choices." The second disadvantage is that it requires more work and a more complicated system design. Therefore, while forcing responses is not incompatible with the invention described here, it will rarely be advantageous (as compared with the new process below).

The recommended training Process provides an effective alternative, using "minimal repertoires", a general strategy suggested by Skinner (1957, pp. 61 ff.). The object of Process 1 is to establish one-to-one mappings of inputs to outputs such that the trainer can subsequently evoke any desired response by presenting the corresponding stimulus.

The first step is construction of a list of minimal response elements such that any performance that will be required from the system can be constructed by combining such elements. The simplest approach, which will very often be adequate, is simply to use the list of network outputs 3. Then a stimulus is specified for each of the responses in this list. Usually there will be a conventional or natural stimulus for each response, such as presentation of a visual stimulus "A" on external inputs 1C paired with a response outputting the letter "A", or a spoken stimulus "Back" paired with the response of moving backwards. More than one such set is possible and often essential (e.g., visual alphabet to spoken alphabet, spoken alphabet to spoken alphabet).

Figure 5:
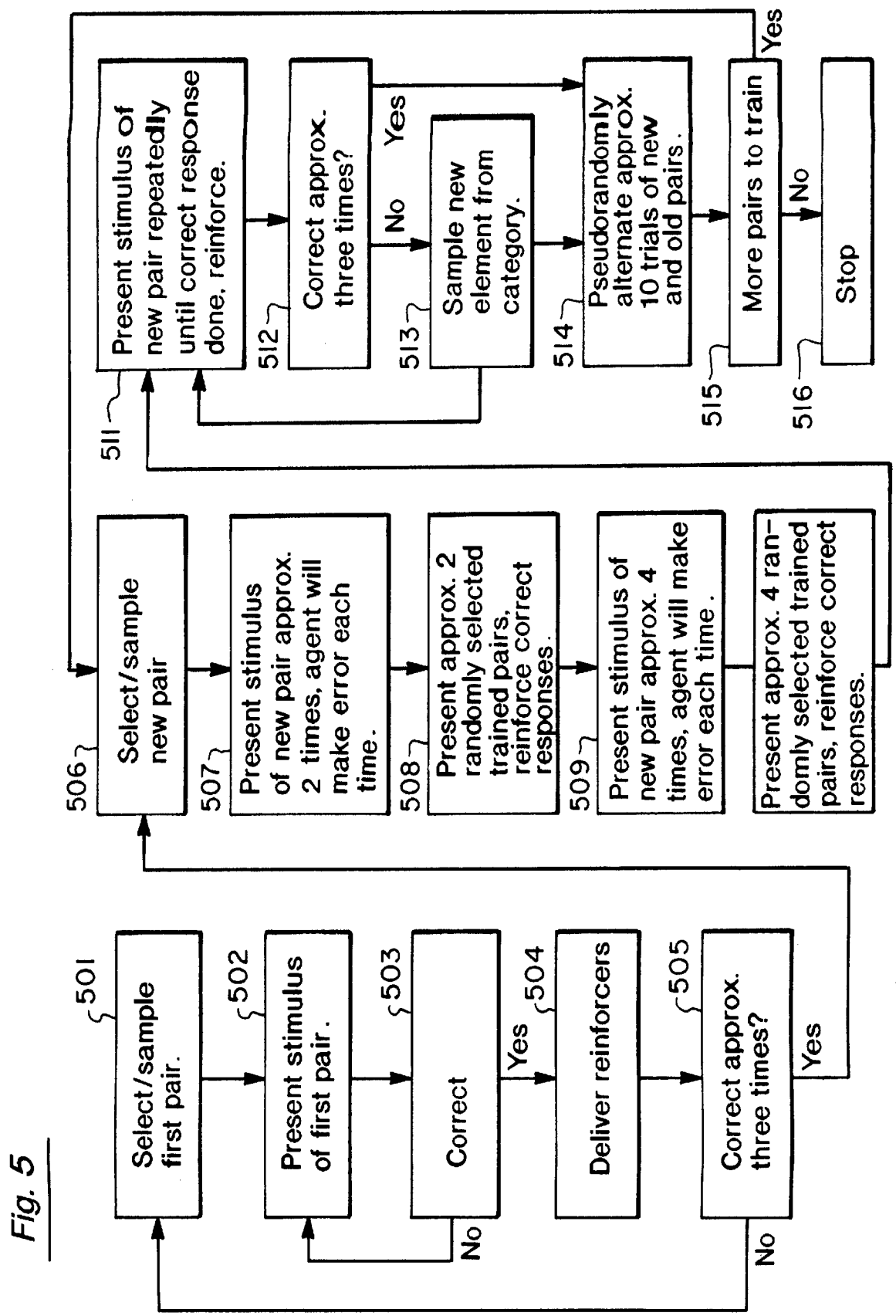
FIG. 5 is a flow chart of a process for training a minimal repertoire.

As shown in the flowchart of FIG. 5, this may be accomplished using Process 1, which comprises the following steps.

501. A first stimulus response pair is selected; if there is any known hierarchy of response values in the initial network, it is most efficient to proceed from the highest-valued to lowest. Often a pair will be a simple pair (e.g., stimulus of see "A", response to say A). However, if the pair is a population of examples, sample from the population. An example of the latter would be where the inputs are human speech sounds processed by a sound analyzer, where the analyzer inputs will vary from case to case (different pronunciations of "A").

502. Present the first stimulus.

503. If the response is correct, go to step 504; if incorrect, return to step 502. Note that even if no consequence is presented after an error, the connections to the erroneous response will generally be weakened by the learning algorithm due to the cost of the response, which should be a positive value. Alternatively, a small negative value could be delivered.

504. The trainer or CBT should deliver a positively valued consequence ("reinforcer") with value greater than the response cost by a multiplier of approximately 1.5.

505. Determine if the response of the current pair been performed correctly approximately 3 times. Note that this criterion must be increased where the stimulus is sampled from a variable population as discussed in step 501. If no, go to step 501 to sample a different pair; if yes, proceed to step 506.

506. Select or sample a new pair.

507. Present the stimulus of the new pair and let the system respond approximately twice. As a result of the previous reinforcement of other response(s), the system will predictably be wrong each time. No consequence is necessary.

508. The training process could again repeatedly present the new stimulus until the correct response was emitted (as with the first pair), but the result of such a strategy would be that before the correct response occurred, the previously-learned responses would be so weakened that it would be difficult to get them to be performed again later. Instead, randomly select approximately two previously-learned pairs, present their stimuli, and reinforce correct responses to strengthen the responses again.

509. Present the new stimulus again a larger number of times (approximately 4) and permit erroneous responses.

510. Present stimuli of approximately 4 randomly-sampled previously-learned pairs and reinforce correct responses each time.

511. Continue presenting the new stimulus until the correct response occurs and is reinforced. Note that logic corresponding to steps 502 through 504 is summarized in box 511 of FIG. 5 to simplify the diagram.

512. Determine if the new response been done correctly approximately 3 times. If no, go to 513, if yes, go to 514.

513. If the stimulus is from a population (see #1 above), sample a new element from the population of this pair. Otherwise, keep the current stimulus.

514. Present the new pair and previously-learned pairs in random order until a total of approximately 10 correct responses have been performed.

515. If there are more pairs to learn, go to 506, otherwise stop.

Note that in many cases it is possible to directly program connection values which implement a reasonable minimal repertoire, as discussed previously. This is generally feasible only when using a localized type of network such as the preferred high-order net, and where the repertoire is a one-to-one mapping (e.g., ASCII "A" input to "A" output, not when inputting a set of sound features to evoke "A"). Even where possible, however, direct programming is not usually recommended for reasons discussed above.

The training in Process 1 shown in FIG. 5 changes the system in such a way that it will be possible to apply some useful ideas from the practice of behavioral training with animals and humans which dramatically increase the efficiency of training compared with "trial and error." These training ideas differ from the prior art in that they permit the system to "imitate" the trainer; almost all cognitive scientists assume that imitation is an innate ability of higher living organisms—but not ANNs—which cannot be trained. Contrary to that belief, Process 1 trains an extremely useful form of imitation which enables subsequent use of efficient modes of instruction with ANNs.

Applicant was able to implement the invention using a Texas Instruments 486/25 PC, running DOS™ 6.22, Windows for Workgroups 3.11™ and Visual Smalltalk™ Version 3.0 from Digitalk. Using a training specification following the flowchart in FIG. 5, an autonomous adaptive agent (ANN) of the architecture in FIG. 1 was trained in a minimal repertoire consisting of stimuli of simulated recognized spoken ASCII characters (A, B, C, F, G, I, M, S, T, U, Y) with simulated responses of matching ASCII characters, plus stimuli of simulated visual characters + and − in the center of a visual presentation field matched with responses of simulated movements forward and backward, respectively. The agent learned all responses to a criterion of no errors after the trials specified in the algorithm were completed.

The training in Process 1 allows novel training techniques.

The first such technique is referred to as "prompt and fade". The object of training is almost always to establish patterns of connections between stimuli and responses with appropriate values. In most cases of verbal behavior as well as much other behavior, the object of training is not a single response but a particular sequence of responses, such as the letters or sounds in a word. To accomplish that, the trainer (which may include computer based training) can first present the target stimuli, then present the sequence of "prompts" for the correct responses for that case. The prompts consist of the stimuli from a minimal repertoire trained in Process 1 to evoke the desired responses. For example, if a minimal repertoire was trained with visual presentation of letters and printed letter responses, then the trainer could present a red object followed by prompts consisting of a visual "R" then a visual "E" then a visual "D". If Process 1 was done correctly, the system will output the sequence of responses "R", "E", "D". The trainer should "reward" correct responses by delivering reinforcers (Primary Values). As the responses are learned, the intensity of the prompts should then be gradually reduced ("faded"), such as making them less visible, weaker, fuzzier, etc. This is done to "transfer" the control of the responses from the connections with the prompt stimuli to the connections with the stimuli which ultimately should evoke the response (e.g., the redness). Prompting and fading can be a very efficient training procedure.

Even if the system repeatedly performs the correct response to each stimulus and receives reinforcers, the system will not learn (i.e., develop connections from the desired stimuli to the correct responses to transfer control from the prompt stimuli) if the quantity of reinforcers is the same as used during training of the minimal repertoire. In psychological research (Rescorla & Wagner, 1972) this failure to learn is known as "blocking". A strategy based on the Rescorla and Wagner equations to overcome blocking is to set the reinforcer amount during instruction to a higher level than that used in previous training (higher by some multiplier such as 1.5). Fading the prompts has the effect of reducing the relative value of the prompted responses. This result produces two remarkably dynamic new quantitative effects when training a sequence of responses:

a. The reduced value of the current response will reduce the "situation value change" component of reinforcement for the prior response in the training sequence. The amount of external reinforcement delivered must therefore be increased to overcome this reduction.

b. An effect in the opposite direction is that the reduced value of the correct response when the prompt stimulus is faded increases the value of transition to the next response. This effect permits a reduction in the amount of external reinforcement for the current response while still producing learning.

The most important goal during "prompt and fade" instruction is the transfer of stimulus control, described at the beginning of this discussion. Therefore a general rule is to fade the prompts as quickly as possible while maintaining an adequate level of accuracy. Because the system learns many irrelevant associations when reinforcement occurs, errors are unavoidable and their punishment is a necessary part of discriminating correct connections. Therefore the strategy here is not to avoid all errors, but to permit those errors which consist of other responses within the current sequence being trained. If a response is emitted other than one in the current sequence, the prompt should be strengthened to a level which evokes one of the responses in the sequence. Preferably this adjustment should be made by stopping the system immediately and refiring the network with a stronger prompt, without leaving any trace of the erroneous response.

If the prompt cannot be changed "on the fly", then the training should be redone with a new agent. With most agents implemented in software, including the preferred embodiment, the state of the agent can be captured and stored at various points during training so that the training need only be restarted from the most recent saved state.

Efficient training depends on the agent receiving a moderately positive reinforcement following correct responses and a net negative consequence following errors. Given the constantly shifting recurrent stimulation, fading of prompts, fading of reinforcement, and the complex effects of transition values 10, it is extremely difficult to maintain a near-optimal training signal. As contrasted with prior animal and human training, the trainer of a computer agent has access to information from inside the system which should be used to increase efficiency of training. The most important information is a total learning signal value, which can be monitored so as to set external reinforcement values to maintain appropriately-valued learning signals.

Real-world environments typically do not provide rewards until some behavior of value has been performed (i.e., actuators 4 in FIG. 1 perform), which usually involves performing at least one entire sequence of responses. The value of doing each response in the sequence should somehow be maintained by external value received only after doing the entire sequence. If no external value is received for an intermediate response, the reinforcement must come from situation transition value (re 8B in system description). That requires that network connection values should be established such that for each response in the sequence except the last, the transition value from the situation of that response to the next will be at least equal to the cost of that response. If the network transition values do not at least equal the cost of each intermediate response before the last one, those responses will weaken each time and the system's "knowledge" and performance will quickly degrade. Note that widely used supervised learning procedures (Hinton & Becker, 1992) will not produce this essential result, so the network produced would not be able to continue in learning mode in the application environment. That is unacceptable for most applications of interest.

Adaptive critic networks are capable of learning such sets of weights when reinforced only by value received at the end of the sequence. However, neither the prior art for training adaptive critic networks nor the general human training literature provides a procedure applicable to ANNs to train a sequence of responses, using prompts which are faded during training, where at the end of training reinforcement is delivered only at the end. The prior art with adaptive critics has generally delivered reinforcers only after the last response in the sequence, and over many trials the value "backs up" to prior responses by the situation transition process. Where that approach is used with living organisms, the last response is taught and reinforced first and earlier responses are added incrementally to the front of the sequence in later cycles as the transition value builds up; this procedure is called "backward chaining". While this procedure may be used, it is very slow not only because of the large number of cycles necessary but also because when earlier responses in the sequence are omitted, no connections can be learned between doing that response (as a recurrent stimulus) and the later responses. The general strategy of the present invention is to repeatedly prompt the entire sequence of responses, and to deliver a pattern of external reinforcers after more than one of the intermediate responses in the sequence during the acquisition phase, while simultaneously fading the prompts as quickly as possible. The object thereby is to build up all the desired response values quickly, then to fade the external reinforcers starting with the ones early in the chain. At the end of this training, each response in the statement will be maintained by a reinforcer delivered at the end of the sequence only. The algorithm will cover most cases, but given the complexity of the dynamic training situations, it is possible that some exceptions may arise for which adjustments may be necessary. For example, after a sequence has been trained, less intermediate reinforcement will be necessary when adding one or more new responses to the beginning or end of the sequence. In such a case, the more basic rules of the strategy apply, that is, to be sure correct responses receive a net positive learning signal and incorrect ones receive a negative signal, while fading prompts and external reinforcement to intermediate responses in the sequence.

Figure 6:
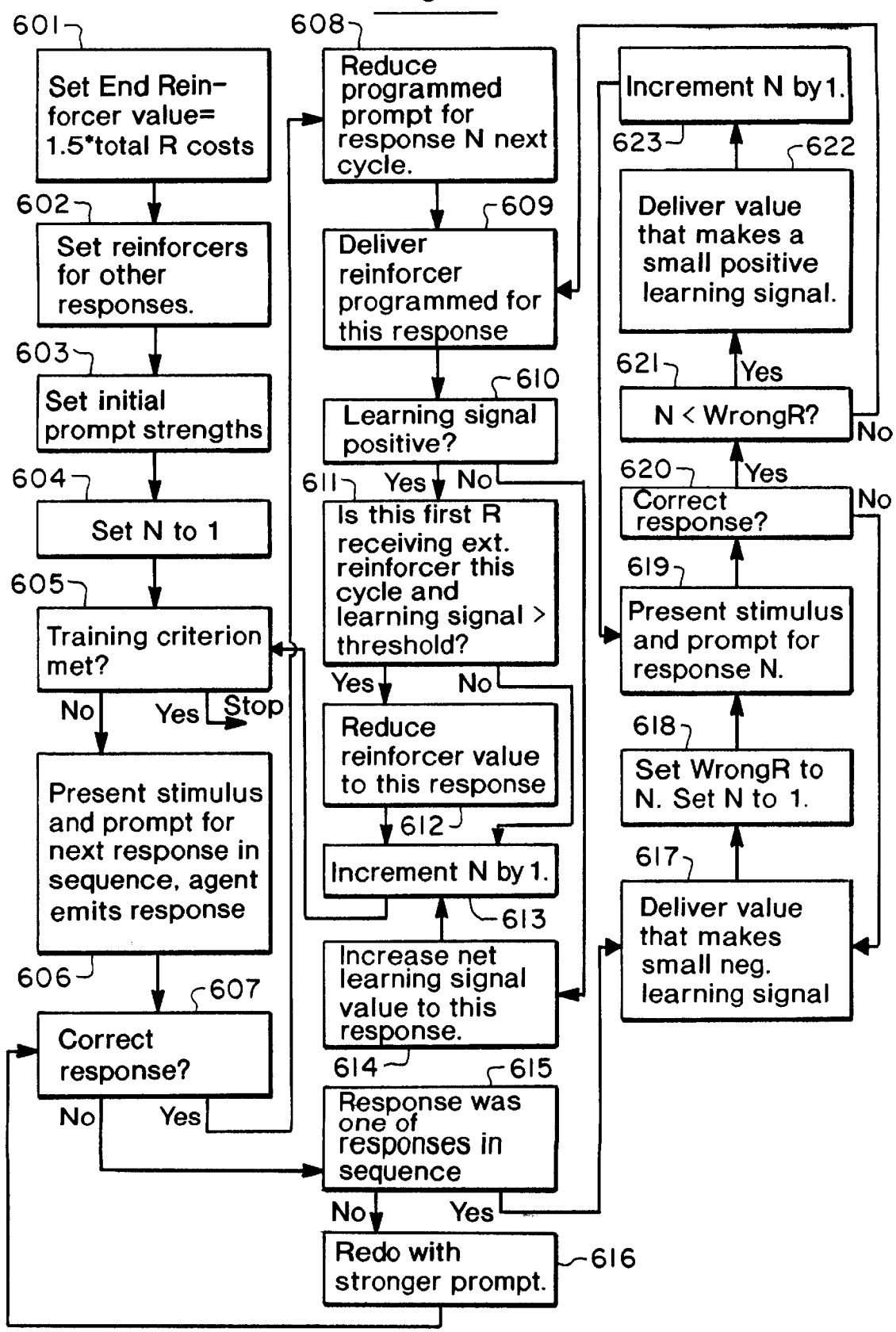
FIG. 6 is a flow chart of a training process for various behavior sequences listed in Table 1.

Referring to FIG. 6, the procedure involves the following steps.

Step 601. Set the reinforcer value to be delivered to the last response of the sequence to a value (call it "End Reinforcer") greater than the sum of response costs of the entire response sequence. An efficient End Reinforcer should be approximately 1.5 times the total of response costs.

Step 602. Set reinforcer values for other responses in the sequence. A default heuristic is to set the value for all responses except the first to End Reinforcer and set the value of the first response to its cost times 1.5. At no time should any response in the sequence be followed by a reinforcement value higher than the End Reinforcer value.

Step 603. Set initial prompt strengths for all responses. Default is full strength (1.0), but can be set lower if prompts have highly discriminated network connections to responses.

Step 604. Set N, the index of the response in the sequence, to 1.

Step 605. Check whether the learning criterion has been met. This criterion is that all responses in the last sequence performed by the agent were correct and each received a nonnegative net learning signal when the only external reinforcer delivered was at the end; further that no prompt is given for any trained response. Note that logic dictates in the case of nondependent responses in intraverbal chains that there must be some level of prompt (e.g., a prompt with intensity of 0.3 of full intensity). If yes, stop training this sequence, if no, proceed to Step 606.

Step 606. For response N in the sequence, present the programmed external stimuli and prompt stimuli. The agent will then emit a response.

Step 607. If the response was correct, go to Step 608; if not, go to Step 615.

Step 608. Reduce the strength of the prompt to response N programmed for the next cycle. The amount of reduction possible can be estimated from the magnitude of difference between the output value of response N and the output value of other responses. An approximate ratio can be determined from prior changes and their effects, which will differ across different agents.

Step 609. Deliver the programmed reinforcer.

Step 610. Determine if the net learning signal was positive? If yes, go to Step 611; if no, to Step 614.

Step 611. Check whether this is the first response in the sequence which received an external reinforcer on this cycle AND the net learning signal was too high (above a threshold defined as moderate reinforcement). If yes, go to Step 612, if no, go to Step 613.

Step 612. Reduce the value of the external reinforcer delivered to this response. Depending on the system implementation, this may be done immediately, or it may require restarting training from a previously stored state of the agent.

Step 613. Increment N by 1. If N now exceeds the length of the sequence, set N to 1 and return to step 605.

Step 614. Increase the value of the learning signal. If a later response in the sequence (i.e., with index>N) received an external reinforcer with value less than End Reinforcer on a previous training cycle, increasing the reinforcer value to that response at that time raises its value on later cycles and thereby raises the transition value to the prior response. Since value changes pass backward in the sequence only one response per cycle, the change in reinforcer value must be made in a prior cycle within the number of steps by which the response follows response N. For example, increasing the value of response N+2 increases the transition value of response N+1 the next cycle and increases the transition value of response N two cycles later. If no prior reinforcer event meets this criterion, raise the value of reinforcers delivered to response N this cycle. As with Step 612, this may require restarting the training from an earlier stored state.

Step 615. If the erroneous response was not one of the responses in the sequence being trained, this is a heuristic threshold indicating that the prompt was too weak (see discussion above), so go to Step 616. Otherwise, go to Step 617.

Step 616. Increase the strength of the prompt to response N. As with steps 612 and 614, this may require restarting the training from an earlier stored state.

Step 617. Deliver an external reinforcer value that produces a moderate negative learning signal.

Step 618. Set a variable "Wrong R" to the index of the erroneous response (N). Then set N to 1.

Step 619. Present the stimulus and prompt for response N, as in Step 616. The agent will then emit a response.

Step 620. Is the response correct? If yes, go to step 621; if no, go to Step 617.

Step 621. Is this response earlier in the sequence than the erroneous response ("Wrong R")? If yes, continue the error correction loop (redo step 621); in no, return to the main training loop at step 611.

Step 622. Deliver an external reinforcer value that produces a small positive learning signal. This value may be less than programmed for that response in the "correct" loop. The object is to comply with a general rule that the total value of reinforcers in any erroneous sequence should not exceed the total cost of responses, to avoid the potential for "trapping" the agent in the error loop.

Step 623. Increment the index N by 1.

Following these rules blindly may require restarting the system many times. It should be feasible to automate the application of these training rules by programming the computer to execute them. In addition, trainers can apply heuristics to enable prompt and reinforcement values to conform to these rules within an acceptable range of tolerance most of the time. Applicant will not attempt to state heuristics here, as they will necessarily vary depending on the neural network learning process used and various response parameters. Learning a new sequence may have an interfering effect on the reliability of previously-learned sequences, especially ones with similar elements and ones learned to a weak criterion. This is an apparently unavoidable property of adaptive systems (including humans), which can be easily handled by reviewing prior sequences, especially the most similar ones (ones with the most sequences in common).

These steps may be applied to a number of specific categories of response sequences described subsequently, as follows.

Category: Tact (Process 302) Stimuli: External objects, properties, or event sequence (e.g., red object, ball rolling) Responses: Conventional verbal responses (e.g. "R", "E", "D") Category: Intraverbal (Process 304) Stimuli: Verbal stimuli. Can be same as Prompt stimuli. E.g., "If green square" Responses: First echo the verbal stimuli (preferable, not essential), then emit the dependent responses in the chain (e.g., echo "If green square", then say "then move back")

Category: Pliance (Process 303, part 1) Stimuli: Verbal command (e.g. "move back") Responses: Conventional responses to comply with command (e.g., move back) Category: Self-pliance (Process 3, part 2) Stimuli: Verbal command (e.g., "move back") Responses: First echo verbal command, then do conventional responses to comply with command (e.g., say "move back" then move back) Category: Mand (step 603 in FIG. 6) Stimuli: Establishing operations to create deprived Primary Value State (e.g., hunger) or situation (e.g., trainer asks agent to tighten a screw) Responses: Conventional verbal response to meet "need" (e.g., "food" or "screwdriver") Note: The reinforcer for mands should be the object or result specified by the mand Category: Textual, reading (Extension of Process 304) Stimuli: Visual or electronic array of verbal stimuli (e.g., lines of text) Responses: First, move visual receptors to beginning of text, then repeat an alternating pattern of echoing (pronouncing) the text within the visual field and moving visual receptors to the next position in text. The sequence may be defined as single lines, or may be repeated until the body of text has all been read.

Category: State implications (step 601 of FIG. 6) Stimuli: Verbal statement, usually relational statement (e.g., "A>B") Responses: Verbal responses comprising statement implied by stimulus (e.g. say "B<A"). If visual stimulus, response may include moving visual receptors as in Textual category Category: Nonverbal behavior sequences Stimuli: Any situation Responses: Any response or sequence Process 2 trains what Skinner (1957) has called "tacting", which are verbal responses performed in the presence of the conventionally-appropriate nonverbal stimuli—for example, saying "RED" in the presence of a red object. Tacting is sometimes called "naming," but tacts are often not "word" units and many are not "names", such as a final "-s" to denote plurality or present tense singular. Tacts also cut across traditional linguistic distinctions; for example, in the descriptive sentence "The red ball rolls across the room", every element may be a tact since each is a response controlled by environmental stimuli. Tact training is closest to what neural network researchers have called "categorization," but it is different from what has usually been done in not having uniquely-correct or mutually-exclusive "categories" for a given pattern, and usually having not one but a sequence of outputs as the required behavior (e.g., the tact for redness could consist of three responses, printing "R", printing "E", and printing "D", in that order). Following the training in Process 1, tact training can now be done efficiently. The trainer first prepares a list of tacts that will be required for the system to effectively meet requirements (though additional tacts can be trained at any later time). For each item the trainer should specify both the response sequence (e.g., print "R", print "E", print "D") and the stimuli which should evoke that behavior (e.g., any object within a specified range of color frequency presented in the visual field). A set of training stimuli should then be created for each item, including both positive and negative (i.e., not red) instances. The positive stimuli should adequately sample the range of properties defined for the tact while varying on irrelevant stimulus dimensions (e.g., vary size, shape, and brightness of red objects). It is helpful to overrepresent examples with the defining tact stimulus dimension having values outside but relatively "close to" the correct range (e.g., orange vs. red), to enhance discrimination from similar tacts. A basic training procedure will apply the General Training Strategy in FIG. 6. The trainer or CBT should present the prepared instances of stimuli for each tact along with prompts for the correct responses for that object. For example, if a minimal repertoire was trained with visual presentation of letters and printed letter responses, then the trainer can present a red object plus prompts consisting of a visual "R" then a visual "E" then a visual "D", to which the system will output "R", "E", "D". Correct responses should be followed by delivery of reinforcement. Preferably reinforcement for tacts should be a value whose magnitude does not depend on the current Primary Value state so as to avoid the response becoming dependent on that state (e.g., use money which is always reinforcing because if food were used, the system might emit the tact only when hungry). The trainer should pseudorandomly mix training of various tacts (e.g., "red", "blue", etc.). Following FIG. 6, fade the intensity of the prompts as the responses are learned so as to transfer the control of the responses from the prompt stimuli to the tact stimuli (e.g., the redness), while simultaneously fading reinforcers.

This tact training will usually automatically produce more complex system capabilities, including metaphorical tacts (e.g., calling a wolf a dog when first encountered because it has some of the same characteristics) and metonymical tacts (e.g., saying "The White House said . . . " rather than "The President said", where the response is correlated but irrelevant). When multiple tacts are performed in the same situation, the issue of ordering or syntax is raised, such as "a red square", not "a square red"; or "cat on table", not "on cat table". This kind of control was discussed by Skinner as "autoclitic", in this case an autoclitic tact. Contrary to what Chomsky and generations of linguists claimed about behavioral methods, the Applicant has shown that the System learns readily to emit the tacts in correct order, and generalizes its learning to completely novel combinations. The simple tacts should generally be taught first, then in conventional order with other tacts, building from simple to increasingly complex relations.

The tact training in Process 2 establishes connections from environmental stimuli to verbal responses of the system—functionally establishing their "meaning" for the system. Process 3 establishes the meanings of a complementary kind of relationship with the environment, connecting verbal stimuli to the system's actions on its environment. For example, upon hearing "Move back" or "Say 'Tree'", the system will perform those (motor) actions with their environmental effects. It is commonly known as "following instructions", with the more precise technical name of "pliance" (Hayes, 1989).

Once again, the General Training Strategies in FIG. 6 provides the basic procedures. The conventional verbal instructions to be learned should be presented as stimuli, followed by prompts for the correct system actions; then the prompts are faded to transfer control of the responses from the prompts to the instructional stimuli while shifting reinforcer delivery to a single final reinforcer. As with tacts, the training should mix the various items in the list being trained.

A valuable technical procedure not in the prior art is that when the instructional stimuli are presented, the system should be trained to repeat (technically, "echo" or duplicate) the verbal instructions (e.g., say "Move back"). Only if the system echoes the instructions will it establish internal connections for performing actions in response to its own "internally-produced" instructional stimuli. That is, in addition to forming network connections from the external instructional stimuli to the appropriate responses, new connections are formed between the recurrent stimuli of its own "echoic" responses (which "match" the external instructions) and the appropriate actions.

Echoing is relatively easy to implement if a minimal repertoire was trained in Process 1 for the same input modality to be used here (e.g., oral sounds, visual letters). If so, the system will already have a strong tendency to echo the instructions, so the trainer mainly needs to be sure the training procedure provides for the echoed responses to be reinforced enough to maintain them (i.e., no strengthening needs to occur for the echoic responses, so the value received only needs to equal the costs of the responses). Negative instructions can be learned. A stimulus of not, "", or equivalent can be presented along with a pliance stimulus; e.g., "not jump". If the system performs the forbidden response in the presence of "not", the trainer delivers punishment. The trainer should present positive ("jump") and negative ("not jump") cases, applied in several different instructions, in pseudorandom alternation.

Process 4 corresponds to training the content of the "knowledge base" in traditional knowledge based systems (or more narrowly, the "rules" in expert systems). The knowledge consists of verbal statements of rules or relations, such as "If red light then stop" (alternatively, "Red light implies stop"), "The frog is on the log", "The capital of Maryland is Annapolis", "2+2=4". In the current system, that knowledge is learned by the system by learning to repeat these statements. Because the system learns literal statements, it can learn any kind of statement. Then what gives these statements functional meaning are the Processes 2 and 3, and any subsequent processes in Process 6. Note that it is quite possible—as it is for humans—to memorize statements before learning their meaning. Functional meaning is demonstrated by the system repeating these statements in appropriate circumstances, "reasoning from them, and ultimately taking effective action based on the circumstances and knowledge.

The technical term for the behaviors in Process 4 is intraverbal" behavior (Skinner, 1957), in which the stimulus for the verbal response is itself verbal—spoken, written, sign language, even graphic—from someone else or the agent itself. The trainer first identifies a list of statements to be trained and specifies which elements of each statement are completely determined by the earlier elements. For example, "4" is determined by "2+2=". Simply saying "2" or "2+" underdetermines the rest of the statement, though there will typically still be some influence from previous learning (in this case, probably the most common response to the ambiguous 2+ would be 2).

For each statement, the object of this Process is to have the system learn to repeat the determined part of the statement without prompting after hearing or saying the initial parts of the statement. As with the other Processes, the value of saying each response in the statement should at the end of training be maintained by value received only after repeating the entire statement. The General Training Strategy of FIG. 6 provides the basic procedure. The prompts for the determined intraverbal elements (e.g. "then stop" after saying "If red light") can ultimately be faded to zero value, but logically the prompts for the early, nondependent elements of the statement must have at least a minimum value, such as 30% of full intensity.

A simply extension to this procedure is for the agent to read the statements from passive textual material rather than hearing them. Reading requires very precisely-controlled sequencing of motor actions (moving the eyes and/or head) with the verbal responses of saying the sounds that are seen. Applicant has trained the system to read textual material in this way. Applicant used a Texas Instruments 486/25 PC, running DOS™ 6.22, Windows™ for Workgroups 3.11 and Visual Smalltalk™ Version 3.0 from Digitalk. The training stimuli consisted of simulated visual presentation of lines of text. The responses consisted of, first, moving visual receptors to beginning of text, then repeating an alternating pattern of echoing (pronouncing) the text within the visual field and moving visual receptors to the next position in text. New lines of text were repeatedly presented. After approximately 20 lines of practice, the agent learned to perform the sequence perfectly.

A further extension of this Process is to train minimal intraverbals or autoclitic frames, where part of the statement is determined intraverbally as above and part of the statement is variable, controlled by other variables. For example, "He calls Joe up", "He calls the old doctor up", where "up" is intraverbally controlled by "call" and the intervening "Joe" or "the old doctor" is controlled by immediate environmental stimuli. The nature of this task is basically the same as in reading text and could be implemented in similar fashion by one skilled in the art.

The four Processes described are adequate to produce a device which can follow direct IF - THEN rules of an expert system (FIG. 3 #5). The Condition of the rule can be a verbal stimulus presented by the user or an external stimulus in the environment which the system has been trained to tact (e.g., present a yellow triangle after training a rule "If yellow triangle . . . ") . The Action of the rule can be any action for which the system has been trained to self-ply.

The prior training also produces simple logical operations. For example, the Applicant has shown that is the system has learned the statement "A implies B" and the statement "B implies "C, then upon presenting the stimulus "A", the system will complete the first statement "implies B" and thereafter chain to the second statement to "conclude" C.

The autonomous agent was first trained in a minimal repertoire following Process 1 and FIG. 5. Then the system was trained to tact object shapes (circles, triangles, and squares, with tacts "C", "T", and "S") by Process 2, with simulated visual stimuli presented in the middle of the visual presentation field. Then the system was trained to tact object colors (green, blue, and yellow, with tacts "G", "U", and "Y") by Process 2, with simulated visual stimuli presented in the middle of the visual presentation field. Then the system was trained to tact objects with combinations of already-trained colors and shapes, with the correct response being to tact the color first, then the shape (e.g., yellow triangle). only eight of the nine combinations were trained, leaving yellow circles for later testing of generalization. Then the system was trained by Process 4 to memorize a rule "If yellow circle then move forward", which was "I Y C T M F" in the simplified language used. Then the system was trained by Process 3 to comply with its own verbal instructions; specifically it learned to say Move Forward ("M F") and then to emit a simulated forward movement. At the conclusion of training, a test was given by presenting a simulated yellow circle in the center of the visual presentation field. The agent correctly tacted the object in the correct word order even though it had never seen a yellow circle before, and many other training trials had been given since tact training. Note that this part of the experiment supports the claim in the description of Process 2 regarding the agent's ability to learn proper word order and use it in novel situations. Then without further stimulation, the agent stated the rest of the associated rule, "T M F" (then move forward). Finally, it complied with the action prescribed in the rule by moving forward in the simulation.

Code provided as Exhibit A to this application implements the experiment described above. By extension, it is possible to train multiple rules at the same time.

Several extensions are possible using the above techniques.

1. Train the system to emit statements "implied" by a stimulus statement. For example, hear "A>C" and say "C<A".

2. Train the system to combine relational statements: present pairs of statements, prompt and reinforce implied responses (e.g., present A>B and B=C, then prompt and reinforce A>C). The system will learn both the generalized responses of combining these relations and the specific facts of the examples.

3. Train the system to mand, which are verbal responses followed by consequences whose form they "specify" (e.g., saying "Food" as a request for food rather than as a tact for food that is present). To train mands for primary values, vary the system's state of those values (deprive the system of food or artificially change the parameter for food deprivation in the system) and train the system to emit mand responses for those values (using prompts and fading as with tact training). For secondary values such as objects or information needed to accomplish an active goal (e.g., requesting a screwdriver when told to tighten a screw; requesting someone's name when asked to make them a name tag), the trainer can perform the corresponding "establishing operations" (e.g., tell the agent to tighten a screw) and train appropriate behaviors. Note that this corresponds to backward-chained/goal-directed reasoning in Expert Systems, which in those systems must be programmed, not taught.

Thus, there has been described a novel Adaptive Autonomous Agent with Verbal Learning that has a number of novel features and advantages, and a manner of making and using the invention. While specific embodiments of the invention have been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure. Thus, the invention is not limited to the specific embodiment described herein, but is defined by the appended claims.

I claim:

1. An adaptive autonomous agent comprising:
   an adaptive critic-type neural network having a plurality of network inputs at least some of which are verbal inputs applied in a selected sensory modality;
   sensors connected to said network inputs;
   a non-verbal network output;
   actuators connected to said first network output;
   means for sensing a current state of said actuators;
   at least one verbal network output;
   training means for establishing sets of connections from the verbal inputs to the first network output and the verbal network output.

2. An adaptive autonomous agent as in claim 1 wherein said sensory modality is auditory.

3. An adaptive autonomous agent as in claim 1 wherein said sensory modality is visual.

4. An adaptive autonomous agent as in claim 1 wherein said sensory modality is electronic.

5. An adaptive agent configured to follow rules, each rule comprising an input vector paired with an output vector, the agent comprising:
   a plurality of inputs responsive to events to provide input vectors to the adaptive agent;
   a plurality of outputs providing outputs to external components;
   a first repertoire comprising a plurality of members, each member comprising an abstract representation of an input vector;
   a second repertoire comprising a plurality of members, each member comprising an abstract representation of an output vector;
   a tact component operative to output an abstract representation from the first repertoire in response to a particular instance of an input vector;
   a pliance component operative to respond to an abstract representation from the second repertoire by outputting a particular instance of an output vector; and
   an intraverbal component operative to store associations between members of the first repertoire and members of the second repertoire.

6. The adaptive agent of claim 5 wherein each member of the first repertoire represents a name for a particular input vector and the tact component is responsive to the input vector to implement a mapping from the input vector to the name for the input vector.

7. The adaptive agent of claim 5 wherein each member of the second repertoire represents a name for a particular output vector and the pliance component implements a mapping from each name for a particular output vector to a corresponding output vector.

8. The adaptive agent of claim 5 wherein the intraverbal component implements a mapping from a member of the first repertoire to a member of the second repertoire.

9. An adaptive agent comprising:
   a plurality of inputs responsive to events experienced by the agent to provide input vectors to the adaptive agent;
   at least one learning component responsive to the input vectors to learn a repertoire of mappings from the input vectors to output vectors;
   a rule following component coupled to at least some of the inputs, the rule following component operative to recognize a set of input vectors as a condition and create a condition-action pair comprising the recognized condition paired to a set of the learned output vectors, wherein the rule following component uses the learned repertoire to perform the pairing;
   wherein the at least one learning component further comprises:
   a primary value register for storing one or more primary values;
   means for adjusting the primary values based upon the responses each time the responses change; and
   sensors coupled to sense the primary values and having sensor outputs coupled to some of the input nodes.

10. The adaptive agent of claim 5 wherein the tact mappings are learned by the agent.

11. The adaptive agent of claim 5 wherein the pliance mappings are learned by the agent.

12. The adaptive autonomous agent of claim 1 wherein the training means comprises:
   a primary value register for storing one or more primary values;
   means for adjusting the primary values based upon the responses each time the responses change; and
   sensors coupled to sense the primary values and having sensor outputs coupled to some of the network inputs.

13. An adaptive autonomous agent with verbal learning comprising:
   an artificial neural network having verbal input nodes for receiving verbal information, verbal output nodes for expressing verbal information, and actuator output nodes for indicating an action wherein the agent responds to verbal information on the verbal input nodes by generating a signal on the actuator output nodes and generating a verbal response on the verbal output nodes such that the verbal response is a symbolic representation of the action indicated by the actuator output nodes;
   a plurality of non-verbal input nodes;
   a primary value register for storing one or more primary values;
   means for adjusting the primary values based upon the responses each time the responses change; and
   sensors coupled to sense the primary values and having sensor outputs coupled to some of the non-verbal input nodes.

14. A goal-directed agent comprising:
   a neural network having a plurality of inputs and at least one output generating a response;
   a primary value register for storing one or more primary values, the primary value representing a goal;
   means for adjusting the primary values based upon the response each time the responses changes; and
   sensors coupled to sense the primary values and having sensor outputs coupled to some of the input nodes.

* * * * *